United States Patent [19]

Lee

[11] Patent Number: 4,625,878

[45] Date of Patent: Dec. 2, 1986

[54] STRUCTURE OF CONTAINER POSSIBLE FOR BULK CARGO CARRIAGE IN ADDITION TO ORIGINAL UTILITY

[76] Inventor: Po-Chao Lee, 7F-2, No. 19, Alley 3, Lane 402, Yen-Shou St., Taipei, Taiwan

[21] Appl. No.: 697,102

[22] Filed: Feb. 1, 1985

[51] Int. Cl.[4] ............................................. B65D 88/00
[52] U.S. Cl. ...................................... 220/1.5; 220/345
[58] Field of Search ........................... 220/345, 346, 1.5

[56] References Cited

U.S. PATENT DOCUMENTS

| | | | |
|---|---|---|---|
| 3,480,174 | 11/1969 | Sherwood | 220/1.5 |
| 3,630,344 | 12/1971 | Bergh | 220/345 |
| 3,667,648 | 6/1972 | Koziol | 220/345 |
| 3,672,529 | 6/1972 | Feddersen et al. | 220/1.5 |
| 3,691,595 | 9/1972 | Backteman et al. | 220/1.5 |
| 4,009,796 | 3/1977 | Schmidt | 220/345 |
| 4,196,844 | 4/1980 | Jacobson | 220/345 |
| 4,342,403 | 8/1982 | Badtke et al. | 220/345 |

*Primary Examiner*—Joseph Man-Fu Moy
*Attorney, Agent, or Firm*—Armstrong, Nikaido, Marmelstein & Kubovcik

[57] ABSTRACT

An improved container possible for bulk cargo carriage in addition to original utility having a door structure on the top surface and on the floor of the container in a central place. When the two doors are closed, water tight, it is used as an ordinary dry cargo container, whereas it can be used to store the bulk cargo, such as grains, soybeans, etc., when containers are stacked up, with doors opened, with top door fitted tightly to the floor doors of the immediate container above. Containers stacked up several units high, with the floor door of the bottom layer closed, present a connecting through hole at the center place allowing a suction/discharge pipe device, which is able to extend and contract to any depth and width, to work therein for loading/discharging of grains to the full capacity of the container load.

1 Claim, 8 Drawing Figures

STRUCTURE OF CONTAINER POSSIBLE FOR BULK CARGO CARRIAGE IN ADDITION TO ORIGINAL UTILITY

BACKGROUND OF THE INVENTION

Since ocean occupies seven tenths of the earth surface, marine transportation plays an important role in the traffic of the world trade. The revolutionary containerized shipment replaces the conventional means of transport to a very great extent except carriage of bulk cargo, such as coal, grains, crude oil and a few other commodities.

The United States of America is, so far, the biggest exporting country of grains in the world. She sells huge quantity of agricultural products in bulk to the Far Eastern nations, such as the Republic of China, Japan, Korea, USSR, Red China etc. The quantity of the export increases each year and is mostly carried to the destination by the conventional bulk carriers although small shipments of the grains are effected by the bulk containers, the number of which is quite limitted. The ordinary general utility dry cargo containers are not suitable for the carriage of the bulk cargo. Tremendous number of such containers must be carried back to the ports, without cargo loaded, in Far-East where the export cargoes await shipment. This is the waste of energy.

It is also an universal knowledge that bulk carriers are serviced, not regularly but in tramp service. The cargo flow is usually affected by availability of the carriers which greatly influence the economical impact of the commodity stock and flow. The assumption of this invention to utilize the empty general dry cargo containers having to be returned to the various ports is to save cost of the shipping operators, with little modification applied to the containers when they are manufactured. New containers must be ordered when old ones reach the end of the serviceability. This invention could be applied when order for new containers is placed.

SUMMARY OF THE INVENTION

This invention is to provide an improvement of the structure of conventional dry cargo container for utilization of bulk carriage in return voyage from the USA to the Far East where the export originates and bulk cargo such grains are imported. This is a revolutionary utility of containers now being used.

The main object of this invention is to construct the containers with door structure both on the top and the floor of the containers at the center place, presenting a through hole when several containers are stacked up in vessels, with doors which slide open. The containers, with doors closed, can serve to the general purpose of dry cargo containers.

Other objects, characteristics and function of this invention will become apparant upon referring to the detailed description following in the drawings annexed hereto.

DETAILED DESCRIPTION OF THE PRESENT INVENTION

FIGS. 1-5

The Sliding Door 1 on the top of Container C and Floor Door 2 on the floor are illustrated. These two doors provide suitable space to permit entering and operation of an auxiliary pipe in the container without reducing the structural strength of the original container purpose. Sliding Door 1. This door is welded and jointed to the top of the Container C. It consists of two main elements Joint Seat 11 and Sliding Window 12. The peripheral section of Joint Seat 11 is a [-shape or one side open box shape ([ shape), forming Guiding Rail 110 at both sides of the Joint Seat 11. Bottom Surface 111 is an opening; there, on the top, are an Opening 112 and a Plane Surface 113 closely positioned in the neighborhood thereof. The Surface and Bottom parts of [ Shape frame 114, 115 of Joint Seat 11 have several Screw holes 116 at the proper positions for fixing bolts 117. At the proper location of the bottom side of frame part 114, there is a place for fixing bolt 118 (shown in FIG. 4). Sliding Window 12 can be set tightly to Joint Seal 11, sliding into Guiding Rail ([ shape) 110. The Sliding Window 12 is attached with Ruber Cushion 121 to make the door water-tight when closed. Said Bolt 117 is used to pressure the Rubber Cushion 121 and said Bolt 118 is used to make Sliding Window 12 firmly positioned.

Figure 4:
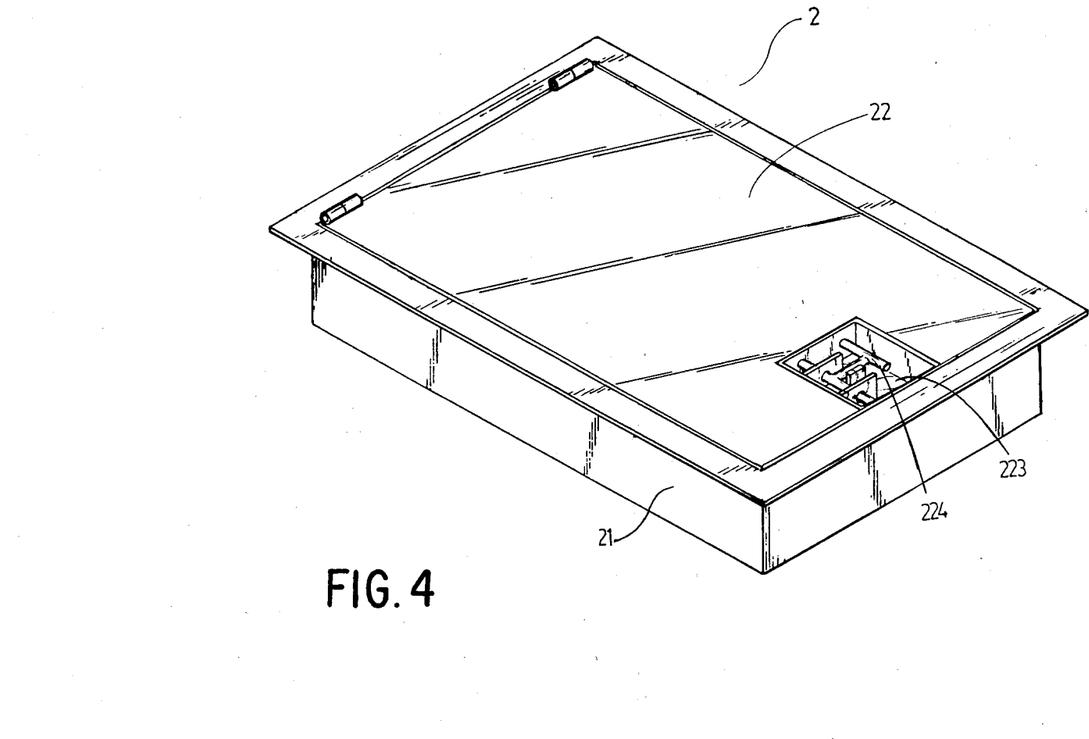
FIG. 4 is a perspective view of the floor door of the invention.
Figure 5:
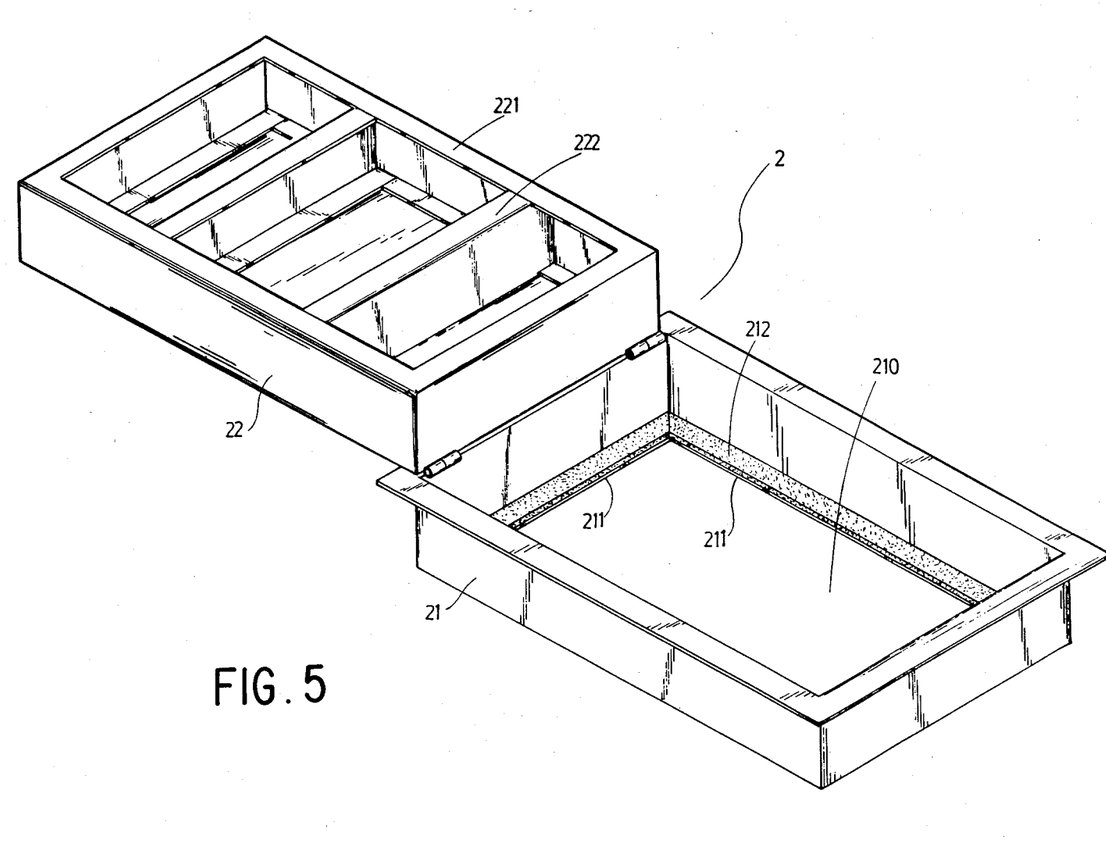
FIG. 5 is a graphic view of the floor door (opened).

Floor Door 2 consists of the Base 21 and the Door Member 22 hinged at one side of the base which forms a Through Hole 210 (FIG. 5) and the Check Edge 211 on which a Rubber Cushion 212 rests. Door Member 22 is designed to be fit tightly into the frame of the Base 21, with its edge pressing on the Rubber Cushion 212, when the door is closed. The structure of Door Member 22 is strengthened with Support Plate 222, same as the structure of the bottom of the Container Proper. On the front side of the Door Member 22 there is a concave recess 223 where the Door Lock 224 is placed.

When the Sliding Door 1 is closed, the Sliding Window 12 is pulled to one side completely (as FIG. 3) to cover the Opening 112 on the top of the Joint Seat 11. Screw Bolt 117 is screwed tightly to the Lower Pad Block 119, thus securing Sliding Window 12 tightly against the Rubber Cushion 121 alongside the Seat Frame 114 and 115, forming an air-tight sealing. When Door Member 22 is closed to Base 21, the Floor Door 2 is then locked to the Base 21 tightly by Lock 224. Now, the container, with sliding and floor door closed, can be used as an ordinary Dry Cargo Container.

When in use for loading bulk cargo, the following process is used:

1. unscrew Bolt 117,
2. push Sliding Window 12 along Guiding Rail 110 to the other end under 113,
3. screw Bolt 118 into place to check Sliding Window 12 from sliding back, 4, unlock Lock 224 of Floor Door 2 and lift Door Member 22 to be placed at the bottom of the container, enabling the Through Hole 210 to open to the opposite of the Opening 112.

Bulk such as grains, is now loaded into carrying vessels, with auxiliary device to suck the cargo into the vessel hold instead of using conventional belt conveyor for loading cargo. The same auxiliary device suctions cargo out of the hold for bagging or into a silo for storage. The device consists of a pipe end into which cargo is absorbed and at the other end an out let from which cargo is poured out. This invention utilizes an auxiliary distribution pipe connected to the main suction pipe. Though it is necessary to provide detail orientation of this auxiliary pipe fititng device, it is not included in the claims of the present invention.

Figure 7:
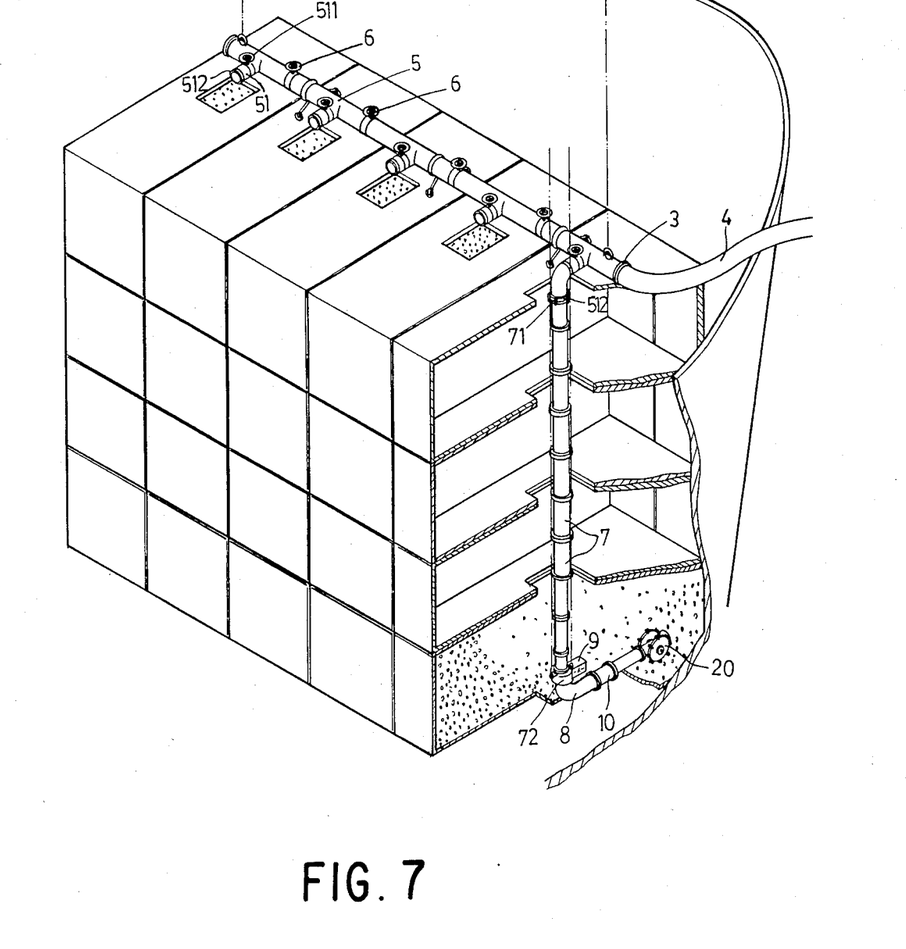
FIG. 7 is a graphic view of auxiliary pipe in operational status.
Figure 8:
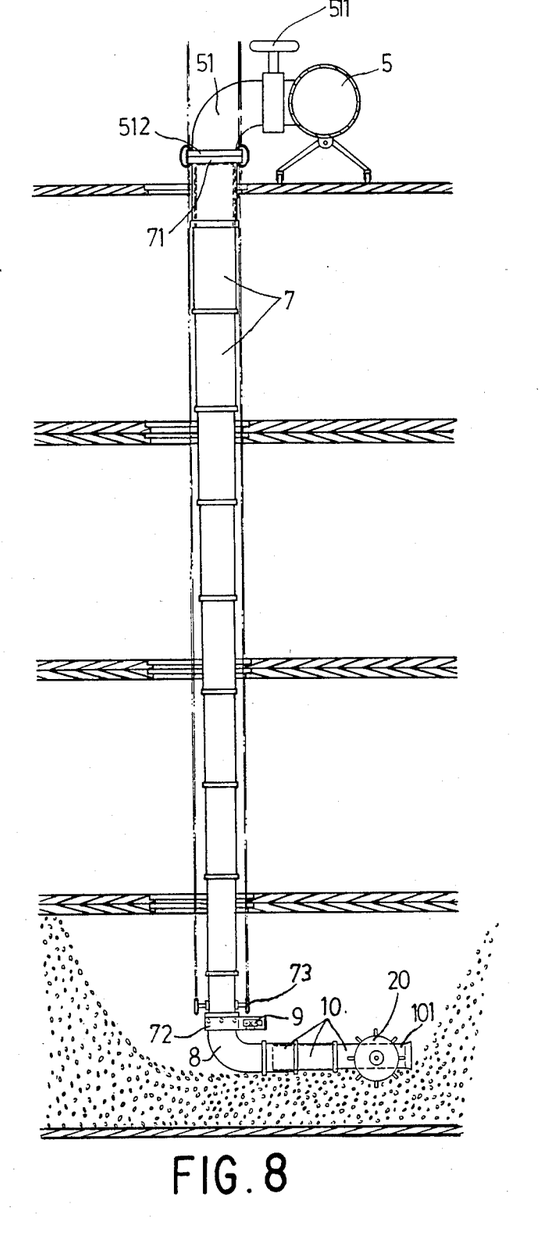
FIG. 8 is a graphic view of auxiliary pipe extending into container.

FIGS. 7 and 8

Said auxiliary distribution pipe equipment provides series of multi-section Pipe Proper 5; between each connecting Pipe Proper 5 there is a Valve 6 at appropriate position for control of compressed air flow up to each section. Along Pipe Proper 5 of each section, there is a short Extruding Pipe 51, with quick Connecting Joint 512 for connecting to a Suction/Discharge End Pipe Device. Each Extruding Pipe 51 is equipped with Valve 511 for flow control of each section. The Suction/Discharge Pipe Device is flexible to extend depth-wise (vertically) and length-wise (horizontally) at the extreme end part. The Pipe Proper 5 has a ring for hoisting the pipe by a crane at a dock to the proper position on the top of the containers. The Pipe Proper 5 after being connected, with one end tightly sealed, has an opening end for connection with the Main Pipe 4 at the Quick Joint 3. The vertical Connecting Pipe 7 of the Suction/Discharge Pipe Device, jointed at Quick Joint 512 of Extruding Pipe 51 with Quick Joint 71 is extensible to any depth for proper operation. At the lower part of the Pipe 7, on the upper part of Elbow Pipe 8 there is attached an Electric Eye 9 at the Joint 72. The Electric Eye 9 is connected to a monitor device to monitor inside situation of the container and displays visually on the CRT in the control panel where the operator can apply proper handling of the device to the desired purpose. The monitor also relays situation of Pipe End 101. The horizontal End Tube 10 is attached with Rotating Wheel 20 moved by the peumatic motor in order to extend or contract the Tube 10 to the desired position.

OPERATION OF AUXILIARY DISTRIBUTION PIPE EQUIPMENT

The above mentioned pipe equipment, in operation, is equipped with two sets of expandable/contractable Suction/Discharge Device for suction/discharge of cargo. The pipe device are connected with vertical Pipe 7 at the Extruding Pipe 51 of the Pipe Proper 5, and also to the Main Hose (Pipe) 4 at the Quick Joint 3. The Valve 6 of the pipe equipment in use is opened to permit flow of the compressed air to the section of the Pipe Proper 5 in use, with the valves of the other section closed The vertically expandable/contractable Suction/Discharge Pipe Device is then put into the container where suction/discharge of cargo is to be effected, with the connecting Pipe 7 adjusted to the desired depth. The adjustment is made possible by dint of Pulley 73 hoisted with the crane which lower the vertical connecting Pipe 7. The horizontally extendable End Tube 10 can be extended to the desired position with help of visual display shown on the control panel. The proceeding of End Tube 10 is effected with Rotating Wheel 20, the Wheel, in suction operation, moves toward the cargo slowly by wheel propelling action and in the meantime the suction Pipe End 101 absorbs grains into the pipe system. The extending and contracting of the End Tube 10 is also enabled by this rotating wheel. The vertical connecting Pipe 7 is connected with Elbow Pipe 8 at the Joint 72 which can rotate to any desired direction. Thus the End Tube 10 together with Elbow Pipe 8 and Electric Eye 9 can rotate in 360 degree with vertical connecting Pipe 7 as the axis. With free movement of the vertical connecting Pipe 7 and horizontal End Tube 10, the suction and pouring of cargo can be performed to the corner of container effectively. When one container of a stack is fully loaded or fully suctioned out, the vertical connecting Pipe 7 is adjusted to the next container in the the stack for pouring or suction operation. In loading, the pouring is first done in the bottom layer of container and moving upward to the next when the bottom container is full. In discharge, suction is made from the top layer of container downward to the bottom layer. The monitor device helps control of suction/discharge to a very great extent.

COMPLETE ENCLOSURE OF STACKED CONTAINERS

Figure 6:
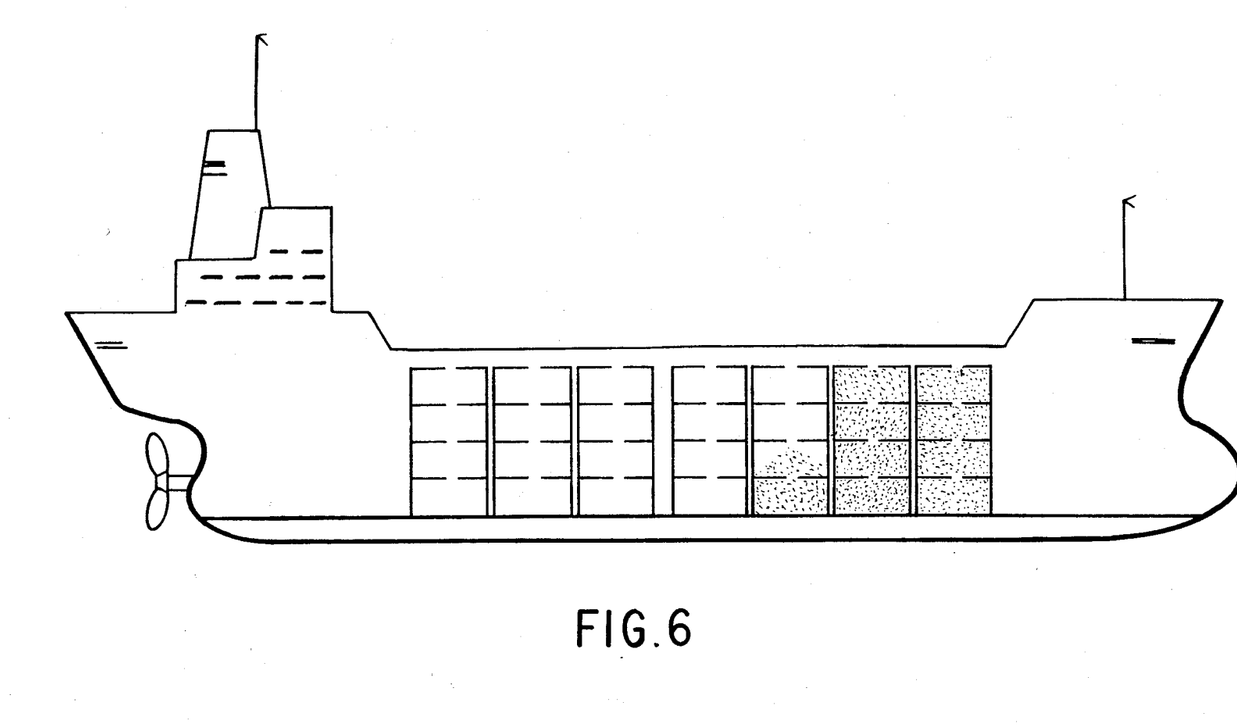
FIG. 6 is a graphic view of the containers of the present invention stacked and placed in the vessel.

This invention renders a particular consideration for the complete enclosure of the stacked up containers, one above one to several layers, as it concerns protection of the cargo loaded into the laid up containers in long transit period. The prevention of sliding-off is firstly secured by Corner Fittings of each container. The main function of the Corner Fitting is to provide holding position for hoisting up of the container in normal operation; the other function is to provide checking access to the other containers when stacked up one above one, thus preventing horizontal sliding. Since ordinary containers, when they are stacked up, have several inches of free sapce between the top of one container and the floor bottom of the container immediately above, this invention also includes consideration for height of extruding portion of the doors to be additionally built on the top and floor of the improved container. The doors are designed to provide a complete sealing when two containers are stacked up together. In case there might be extra space, owing to wear and tear of container usage, an additional padding or cushion might be placed to make the enclosure complete in order to provide safe protection of the cargo loaded within.

According to international standards of load, a forty foot container is possible to sustain 35 metric tons load or 50 Cubic Meters (distribution of weight is 1.4 CBM/IMT). Under static status, the load weight is about 75 metric tons. This invention refers the loading of cargo under the static condition and there will be no problem for sustaining the load with presence of strength shortage of the structure.

I claim:

1. An improved structure of a shipping container, the container having a top and a floor with structural supports therein, the improvement compriing a sliding door welded and connected to said top and a floor door connected to said floor at a position corresponding vertically to said sliding door, said sliding door including a joint seat formed as a frame of C-shaped members defining guiding rails at each side of said sliding door, said joint seat having a bottom surface open to an interior of said container and a top surface with an open portion and a covered portion, a sliding window member slidably mounted in said frame and movable between a first position completely closing said open portion and a second position opening said open portion, and means for fixing said window member in one of said first position and said second position; said floor door including a base frame having an open center and a check edge extending inwardly toward said open center with a rubber cushion thereon, and a door member hingedly connected to said base frame and sized to rest on said rubber cushion on said check edge when closed to completely seal said floor door, said door member having the same structural support as said structural support of said floor, a concave portion, and locking means in said concave portion; whereby with said sliding door and said floor door closed, said container is suitable for use as a general utility dry cargo container and with a plurality of containers stacked up one over another in layers and said sliding door and said floor door of each open, a through hole is provided from a top layer to a bottom layer for loading or discharging of bulk cargo.

* * * * *

UNITED STATES PATENT AND TRADEMARK OFFICE
CERTIFICATE OF CORRECTION

PATENT NO. : 4,625,878

DATED : December 2, 1986

INVENTOR(S) : Po-Chao LEE

Figure 1:
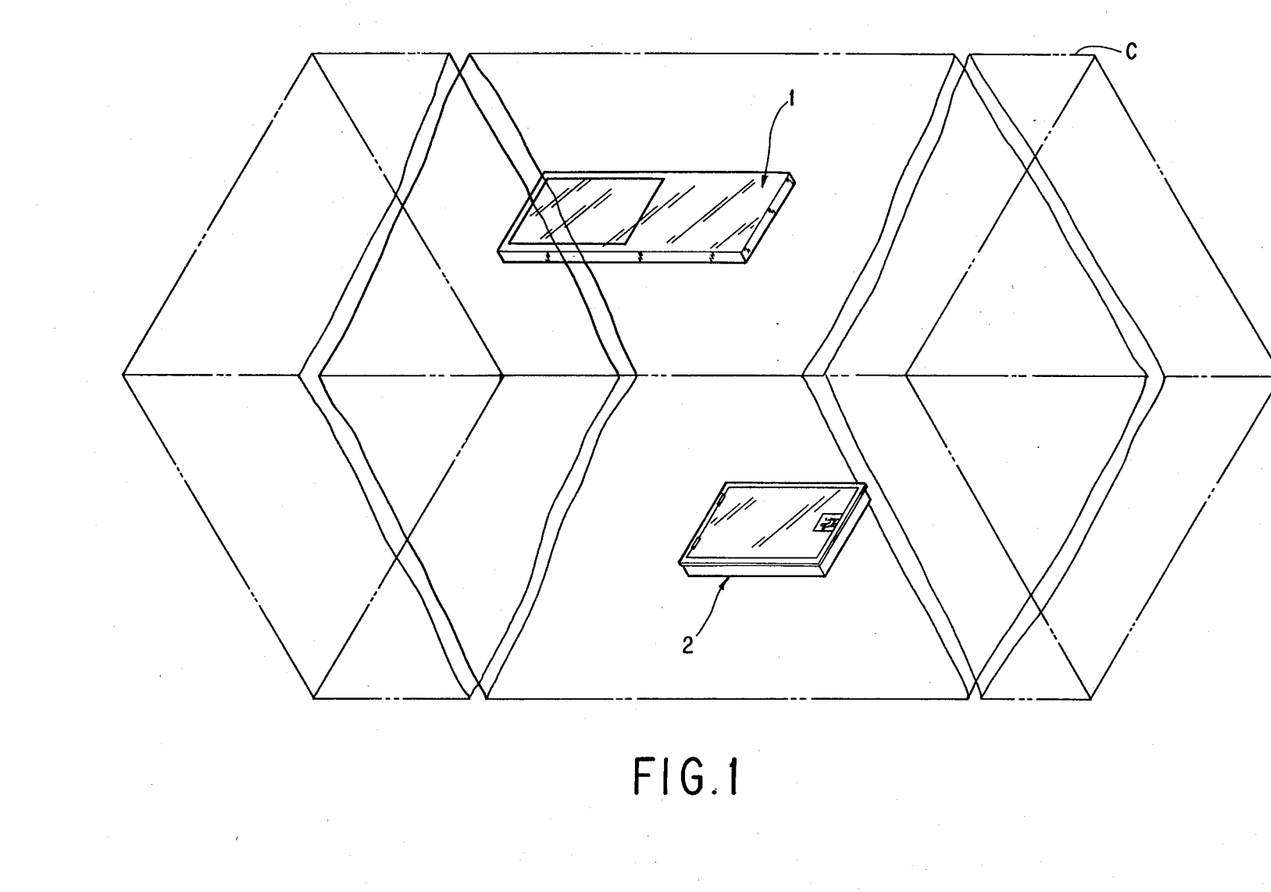
FIG. 1 is a graphic view of the present invention.
Figure 2:
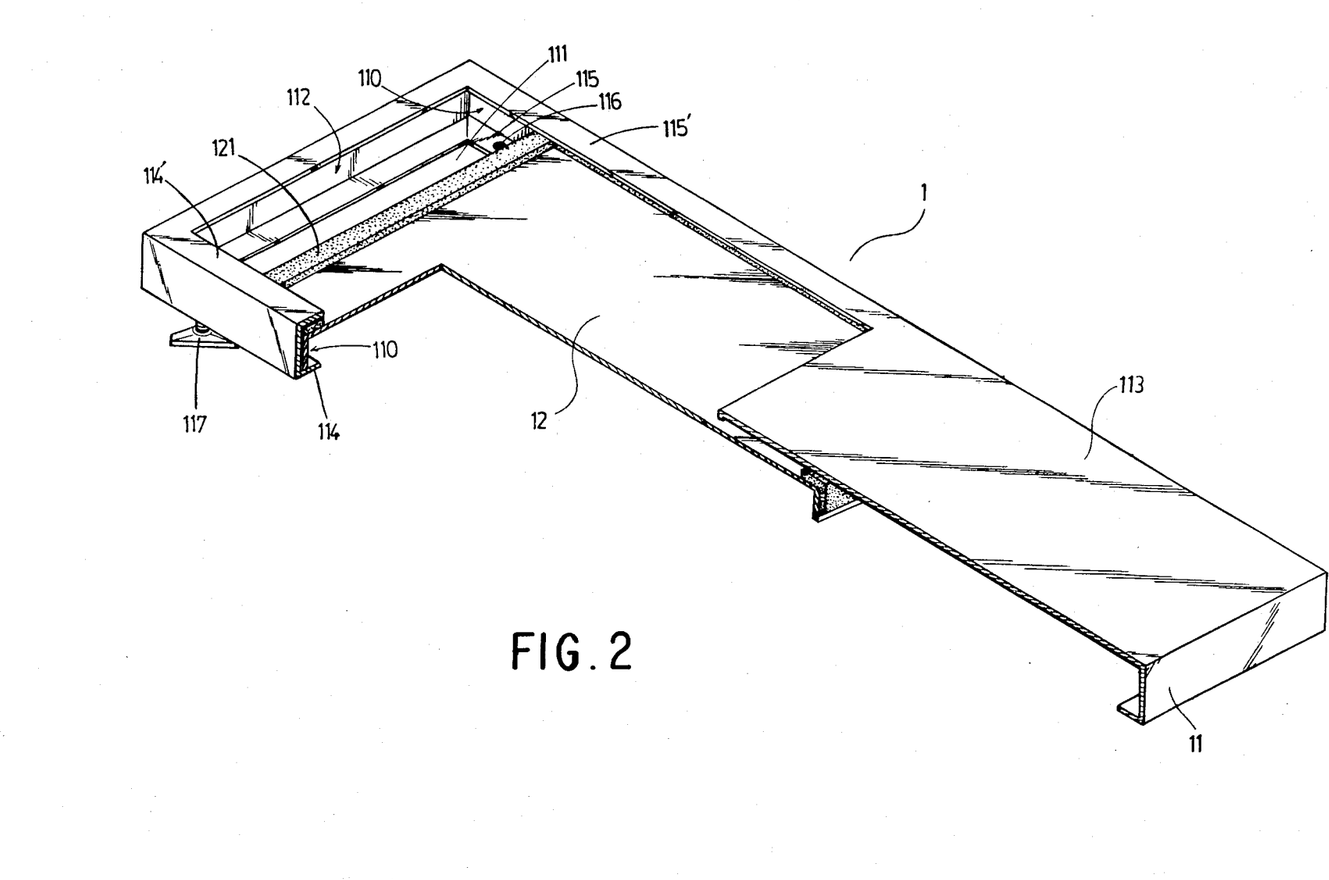
FIG. 2 is a sectional view of the sliding door of the present invention.
Figure 3:
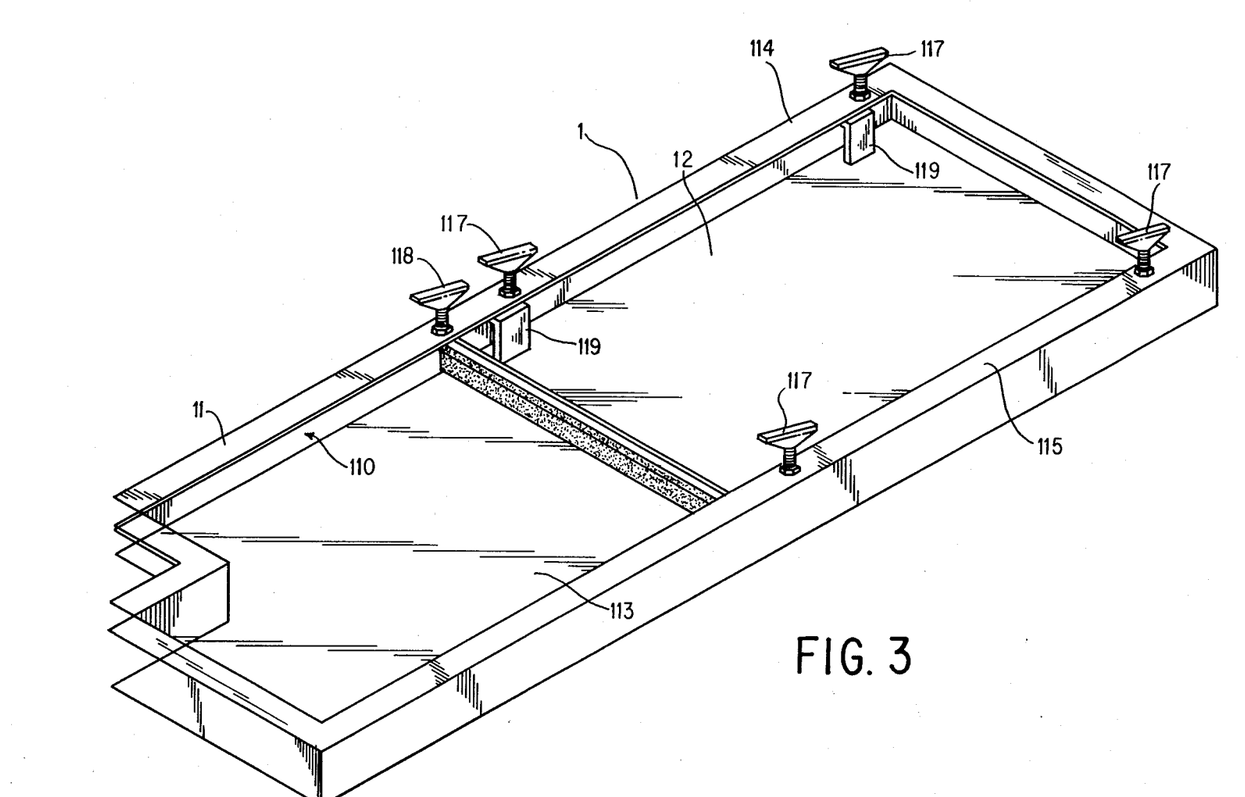
FIG. 3 is an elevational view of the sliding door seen from the bottom.

It is certified that error appears in the above-identified patent and that said Letters Patent is hereby corrected as shown below:

Substitute attached Figure 3 for Figure 3 presently in the patent.

Signed and Sealed this

Twelfth Day of January, 1988

Attest:

DONALD J. QUIGG

*Attesting Officer*    *Commissioner of Patents and Trademarks*

FIG. 3